Nov. 27, 1934.  J. L. ADAMS, JR  1,981,894
METHOD AND APPARATUS FOR FORMING AND WELDING ARTICLES
Filed July 15, 1930  3 Sheets-Sheet 1
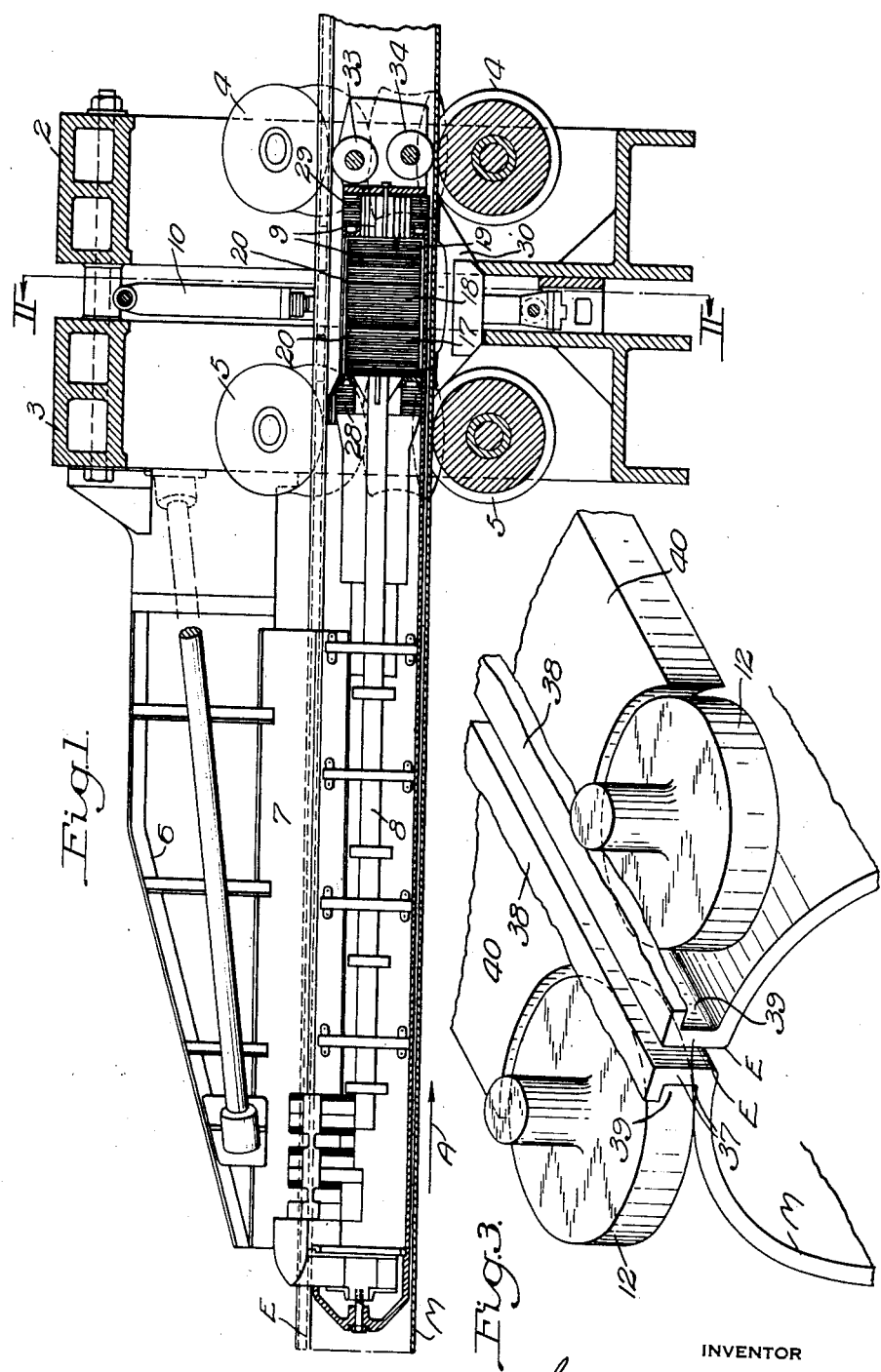
INVENTOR

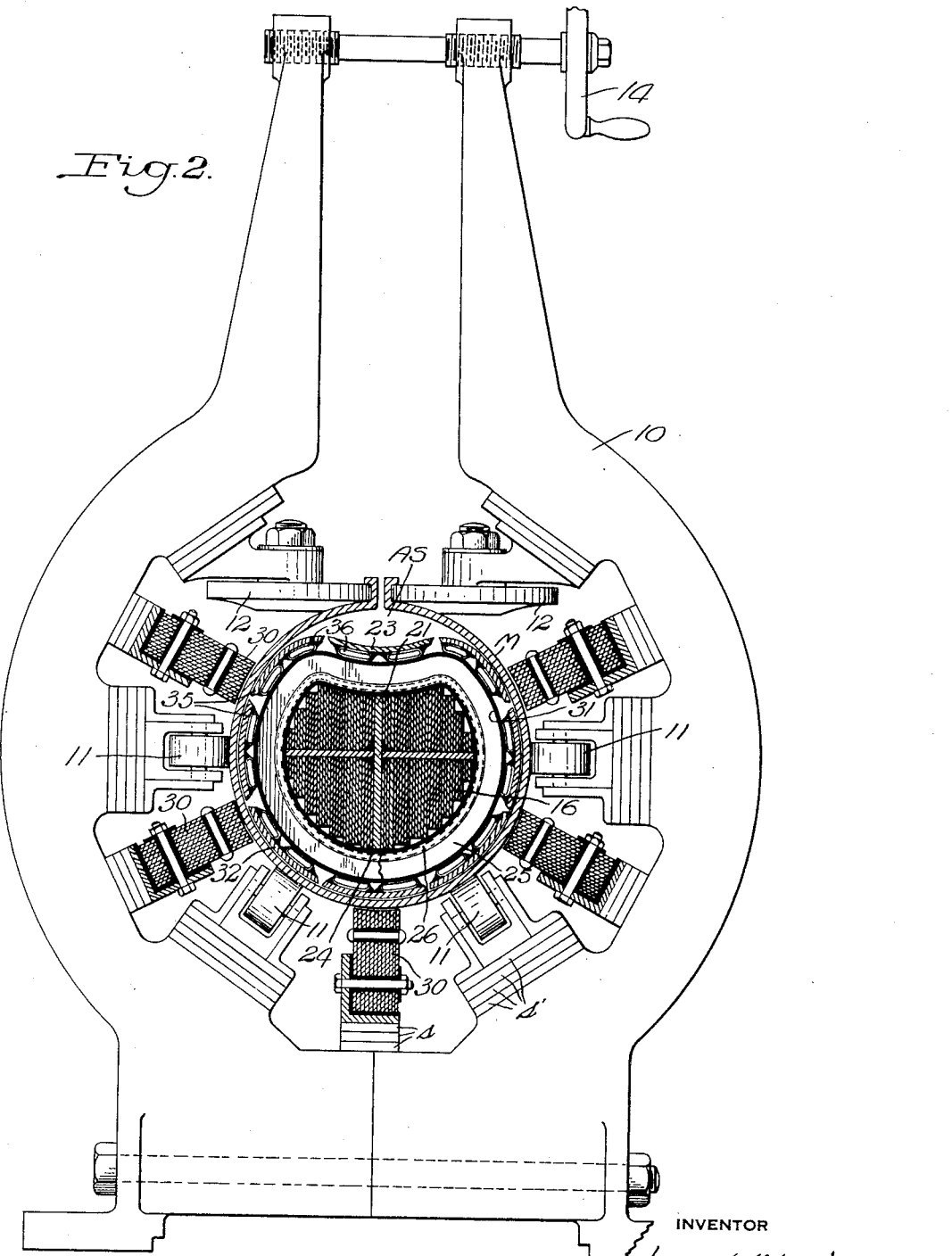

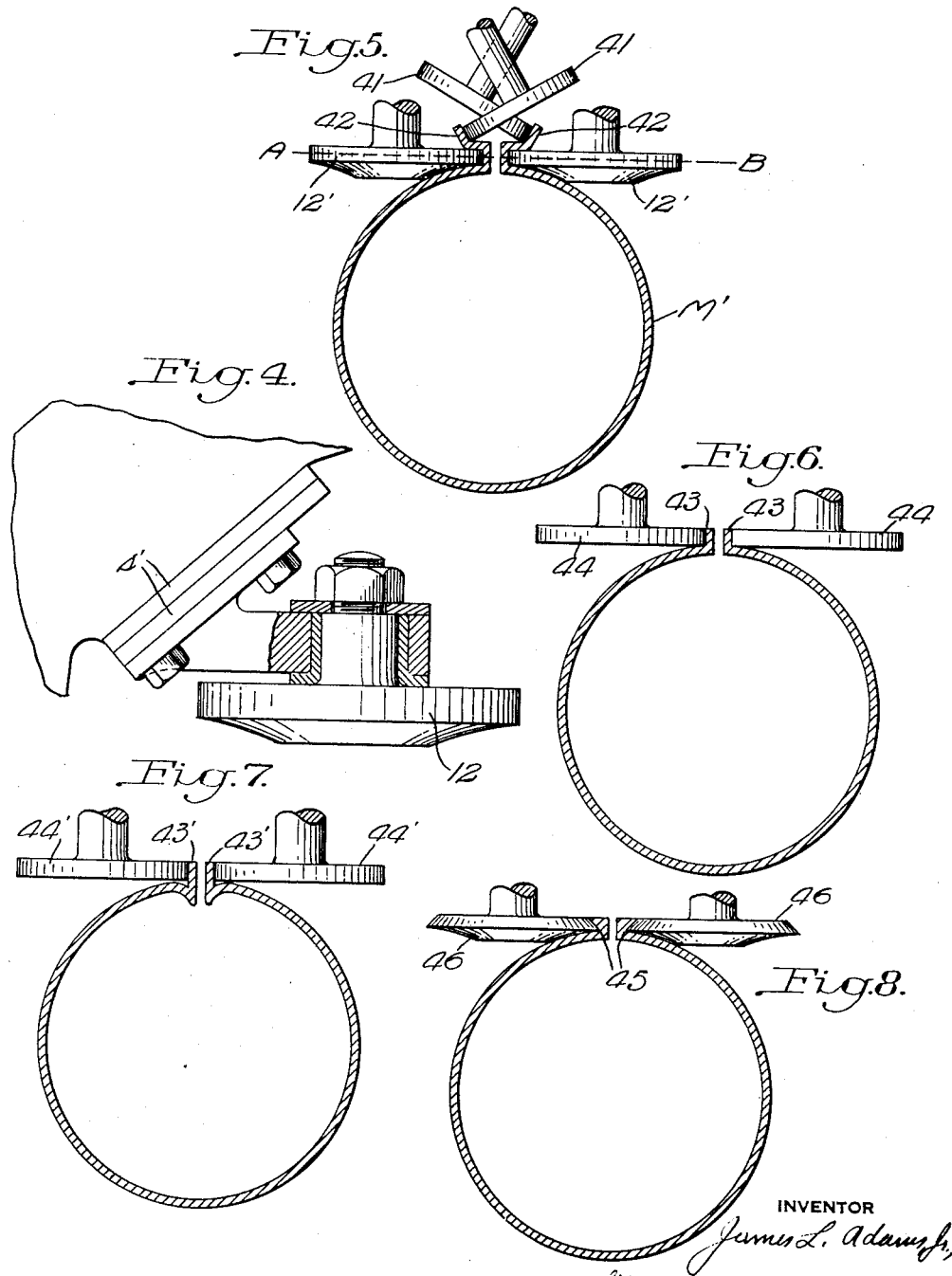

Patented Nov. 27, 1934

1,981,894

UNITED STATES PATENT OFFICE 1,981,894

METHOD AND APPARATUS FOR FORMING AND WELDING ARTICLES

James L. Adams, Jr., Youngstown, Ohio, assignor to The Youngstown Sheet & Tube Company, Youngstown, Ohio, a corporation of Ohio Application July 15, 1930, Serial No. 468,176

9 Claims. (Cl. 219—6)

The present invention relates broadly to the art of welding, and more particularly to the art of electric welding, although certain features of the invention are not limited to the particular welding operations employed.

The increasing demand for welded articles, such for example as tubes, pipes and the like, has led to the development of certain distinctive methods and apparatus for effecting the shaping up and welding of such structures. The types of electric welding equipment which lend themselves most satisfactorily to the requirements of commercial protection may be designated as the induction type and the several forms of contact types.

The induction type of welder may be of such construction as to effect the desired heating and welding by a so-called flash operation or by a so-called resistance operation, or by a combination of the two. The contact type of apparatus, regardless of the particular construction, may also be operated to produce either a flash, a resistance or a combination of flash and resistance welding operations. The limitations of the contact type of welding apparatus have heretofore been such as to limit the thickness of the material being welded within rather narrow limits and to comparatively thin gauges. The induction type of apparatus as heretofore utilized has, on the contrary, been generally considered as useful only in connection with the welding of materials of relatively greater thicknesses, such as thicknesses of from one-quarter inch to three-quarters of an inch.

The induction type of apparatus as heretofore utilized has also been characterized by the fact that it has been limited with respect to the shape of the material being welded. Thus, for example, if utilized for the welding of substantially tubular material, it has been necessary to maintain a substantially constant diameter throughout the length of the material. This has made this type of apparatus generally unavailable for the welding of columns, posts, pillars and the like, which are characterized either by a taper at some point in the length thereof, or from end to end, or by changes in cross sectional shape at different portions.

It is one of the objects of the present invention to provide an improved welding apparatus and method of welding, preferably of the induction type, of such characteristics that it is possible to utilize the same on materials of any commercial thicknesses, and without limitation as to the cross sectional shape or changes in cross sectional shape of the articles which it is desired to form.

Another object of the present invention is to provide a method and apparatus of welding by means of which it is possible at all times to insure the production of a weld having a strength at least as great as the strength of any other portion of the material in which the weld is formed.

Still another object of the invention is to provide a method and apparatus characterized by subjecting the adjacent edges to be welded to a shaping or deforming operation effective preferably not only for stiffening the edges and providing a greater area of contact therebetween, but also for making possible a more accurate control and positioning of the edges during the heating and welding operations. Such a construction also provides excess metal in or adjacent the line of weld in which pock marks, pockets and the like incidental to the welding operation are concentrated where they can be readily removed by suitable subsequent operations.

A further object of the present invention is to provide a method and apparatus of welding such as to preclude the possibility of depositing portions of ejected metal on the surfaces, adjacent the seam, of the metal being welded and thereby preventing such ejections from being subsequently rolled into the metal and deducting from the effective net thickness thereof.

Other objects of the invention will be apparent as it becomes better understood by reference to the accompanying specification and drawings forming a part thereof, the drawings showing, for purposes of illustration only, certain preferred embodiments of the invention. In the drawings:

Figure 1 is a view partly in longitudinal section and partly in elevation of one form of apparatus which may be utilized for the carrying out of the present invention;

Figure 2 is a transverse sectional view, on an enlarged scale, along the line II—II of Figure 1, looking in the direction of the arrows;

Figure 3 is a detail perspective view illustrating the portion of the apparatus particularly adapted for maintaining the desired cleanliness, positioning and alignment of the material and seam edges respectively;

Figure 4 is a detail view, on an enlarged scale, partly broken away, partly in section and partly in elevation, showing one of the seam aligning rollers together with the mounting therefor;

Figure 5 is a partial sectional view, similar to Figure 2, illustrating a modified embodiment of the invention;

Figure 6 is a view similar to Figure 5, illustrating the invention as applied to the treatment of material of slightly different cross sectional shape;

Figure 7 is a view similar to Figure 6, illustrating still another material contour; and Figure 8 is a view similar to Figures 5, 6 and 7 illustrating the invention as applied to material having different edge shape.

Induction welding apparatus of the character heretofore commercially utilized for the formation of substantially tubular material has been characterized by the use of the material itself as a movable secondary for a primary coil or coils suitably positioned either within the material, outside of the material, or partly within the material and partly outside thereof. The present invention is applicable to an induction welding apparatus characterized by any desired coil construction and location. In view, however, of the fact that an internal coil, by reason of the outward repulsion which it exerts, tends to force vapor and molten metal particles outwardly through and away from the seam, I have herein shown the invention as applied to an apparatus of the internal coil type.

In the commercial use of such apparatus it has heretofore been found that the repulsion referred to is of such magnitude as to also tend to deflect the edge portions of the material being welded, thereby making it exceedingly difficult to utilize such an apparatus for the welding of relatively thin gauges of metal. Where the coil has been supplied with a periodically varying current, the repulsion effect produced has likewise been one of periodically varying magnitude, whereby the edge portions of the material being welded tend to vibrate, thereby interfering with the proper alignment, positioning and welding thereof. In accordance with the present invention these objectionable tendencies and limitations of an induction type welding apparatus are substantially removed and the apparatus made adaptable to the welding not only of the heavier gauges as heretofore, but also of lighter gauges, and the production of a better product by reason of the elimination of the vibrational tendencies, the more accurate positioning and holding of the edge portions, and the shielding of the material from the accumulation thereon of ejected material.

An internal coil structure as heretofore employed has also necessarily been of such diameter as to permit the passage thereover of the material being welded. In order to maintain the material in substantially concentric relationship to the coil structure, as well as to maintain the desired cross sectional characteristics of the material, it has been necessary to provide peripheral holding means, such as a series of rollers defining a roll pass or roll passes, effective for engaging the outer surface of the material and holding it approximately to size and contour. This construction has made it necessary to limit the apparatus to the formation of articles having a substantially constant cross sectional shape and size from end to end thereof. By reason of the improvements characteristic of the present invention, an induction welding apparatus of the internal coil type is made adaptable to the welding of structures characterized by shape and/or contour variations in different portions thereof or from end to end thereof, in addition to its normal application to substantially tubular articles of constant cross sectional characteristics.

Many of the advantages obtainable in accordance with the present invention result from subjecting the material to an edge shaping or deforming operation such as to provide an edge portion preferably characterized not only by greater stiffness in a direction substantially radially to the material contour, but also characterized by a shape such as to facilitate the cooperation therewith of means controlling and defining the position, alignment and spacing of the edge portions of the material.

Referring more particularly to Figures 1 to 4, both inclusive, of the drawings, there is illustrated a welding apparatus of the induction type substantially as disclosed and claimed in my copending application Serial No. 461,979, filed June 18, 1930. This apparatus includes a welding stand 2 and a crushing or sizing stand 3 characterized by the provision therein of welding rolls 4 and crushing rolls 5, respectively.

Extending outwardly from the crushing stand 3 is a support 6 carrying a center plate 7 to which is secured an inner "torpedo" like structure 8. The structure 8 at its forward end comprises an inner coil and core assembly 9 which will hereinafter be described in greater detail, the primary purpose of the structure just described being to afford supporting means for maintaining the inner coil and core assembly in such position as to permit the passage thereover of substantially tubular formed up material M being welded.

In the operation of the apparatus the substantially tubular material may be fed thereto in any desired manner with the adjacent edges E straddling the supporting plate 7, whereby the supporting plate or guide rolls mounted thereon may serve, if desired, as part of the means for maintaining the desired alignment of the material. It will be understood, however, that any special means for this purpose may be provided at the will of the operator or the designer of the apparatus.

It will be understood that the term substantially tubular material is herein utilized as an expression of definition and not one of limitation. Within such term, I wish it to be understood that I include not only substantially circular or cylindrical articles of approximately constant cross sectional area from end to end, but also articles of more or less conical type, or having abrupt or gradual changes in the cross sectional configuration thereof. The term therefore includes articles characterized by edge portions brought together to define a substantially enclosed space regardless of the shape or irregularities of such space.

Where the material is substantially cylindrical, as illustrated in the figures under consideration, it will travel into the apparatus in the direction illustrated by the arrow A, the leading end being initially engaged by the rolls 5 in the housing 3. These rolls in addition to exerting a guiding and feeding action on the material, will also be effective for crushing, sizing or shaping the same to the extent determined by the position to which they are adjusted. Conveniently, however, the adjustment may be such as to bring the edges of the material into abutting pressure relationship during their passage through the housing 3. After leaving the rolls 5, the natural tendency of the material will be such as to cause these edges to progressively separate. In order to control the amount or extent of such separation, for purposes which will be hereinafter more fully described, I may provide an intermediate frame 10 carrying a series of rollers 11 and/or a pair of rollers 12, or their equivalent, adapted to engage the material at predetermined points thereon, assist in guiding the same, and control the extent of separation of the edges E.

Inasmuch as it may be desirable to control the amount of separation of the edges under different conditions of operation, the frame 10 is preferably of such construction as to be adjustable to a limited extent. This adjustment may be afforded by a hand wheel 14, or equivalent means, extending through the upper portion of the frame and having such threaded engagement 15 therewith as to enable the frame to be contracted or expanded to thereby correspondingly move the rollers 11 and/or 12 toward or away from the axis of the material M, and in this manner accurately control the space between the edges E thereof.

After leaving the rollers 11 and/or 12 in the intermediate frame 10, continued forward movement of the material will bring it into engagement with the rolls 4 in the housing 2, which rolls for purposes of convenience have been referred to as the welding rolls since their primary function is to bring the edges of the material into abutting relationship under sufficient pressure to effect the weld, the edges of the material having previously been heated to such a temperature that the desired welding operation may be effected at this point.

This heating of the edges to a welding temperature is preferably accomplished by inducing in the material which, as before pointed out, serves as a movable secondary, a heating current of the desired magnitude. For inducing such a current, there is provided the inner coil and core assembly 9 which is herein shown as comprising a central core 16, at least a portion of the length of which is surrounded by a primary coil structure herein illustrated as comprising sections 17, 18 and 19. These coil sections which are preferably in co-axial relationship one to the other, and which may be longitudinally spaced or separated from each other by suitable insulation 20, may be electrically connected in parallel to a suitable source (not shown) of periodically varying current, or may be connected in series one with the other, with the different sections of the coil connected to successive taps or a suitable power or regulating transformer (not shown).

In either case, the effect will be to provide a plurality of sections each of which will operate at a maximum efficiency as soon as the material has passed thereover to such an extent as to substantially enclose the same. In this manner the disadvantages of a single longitudinal inner coil, and its characteristic effect at such times as a portion only thereof is embraced by the material being welded, are obviated. This makes it possible with a given source of current to obtain a less shading off of current, and therefore of heating, in the end portions of the material, and makes possible a greater energy input into such end portions whereby the same may be effectively heated to the desired welding temperature.

While I have herein illustrated each of the coil sections 17, 18 and 19 as being of substantially the same longitudinal dimensions, it will be understood by those skilled in the art that the length of the individual sections or the number of turns connecting the same may be varied as desired in order to obtain any particular operating characteristics which may be best suited to the material being welded.

In order to afford the desired rigidity to the inner coil and core assembly, such assembly may be built around a suitable supporting structure 21.

The core is further characterized by being asymmetrical on opposite sides of the substantially horizontally extending plate 22 of the supporting structure 21, this asymmetrical relationship being obtained in accordance with this embodiment of the invention by providing either a substantially flattened or indented top 23 on the coil and/or core. Surrounding the core is a suitable sleeve 24 of insulating material around which the coil sections 17, 18 and 19 are preferably edgewise wound, the individual turns of the different coil sections conforming to the contour of the core, or being shaped to give the desired characteristic top 20 as before described. The inner coil and core assembly is further so disposed with respect to the rest of the apparatus that the portion 20 thereof lies below the spaced edges E of the material, in case of a top seam, or above the same in the case of a bottom seam, and at a greater distance from such edges than the distance between the remainder of each turn and the general inner surface of the material. This affords a construction in which the portion of the coil adjacent the region of maximum heat in the tubular material is afforded the best protection from such heat by being at the greatest distance therefrom.

The coil sections, as illustrated in Figure 2, preferably comprise edgewise wound copper straps, bars, or tubes 25. In the case of straps or bars they will preferably carry an inner water cooling duct 26 suitably associated therewith, and providing convenient means for constantly cooling the coil sections. Edgewise windings give a minimum voltage between turns that is possible for any construction, and generally give lower eddy current losses.

The inner coil and core assembly also preferably comprises pole pieces 28 and 29 preferably located adjacent opposite ends of the coil assembly. These pole pieces may, if desired, constitute part of the core structure itself, or may, as herein illustrated, comprise suitable built up additions to the core. Cooperating with these pole pieces and with the inner assembly as a whole, are laminated yokes 30 constituting a return magnetic circuit for the inner coil and core assembly. As illustrated in Figure 2, these yokes are carried by the intermediate frame 10 in peripherally alternating relationship to the rollers 11. Each of the yokes 30 preferably comprises a series of laminations spaced from the outer surface of the material M, with each of the laminations extending in a substantially radial direction, the ends of the laminations being so shaped as to extend as closely adjacent the rolls 4 and 5 as possible in order to thereby afford an effective magnetic return path.

In Figure 2 of the drawings the laminated yokes are shown as secured to the intermediate frame in such spaced relationship thereto as may be determined by insulated shims s, whereby upon changing the number of shims, radial adjustment of the yokes is afforded as may be desired for changes in the size of the pipe being operated upon. In like manner, the rollers 11 and 12 in the intermediate frame are shown as carried by similar shims s' which function in the same manner, thereby permitting the yokes and rollers to be moved inwardly or outwardly as required for any particular set of operating conditions.

It will be noted that the two uppermost yokes 30 are on opposite sides of the seam, and also on opposite sides of the specially shaped top portion 20 of the coil structure. This position is desirable for the reason that while it is impossible to very materially control magnetic leakage through the air space AS afforded by reason of the specially shaped coil structure, the two yokes in question do have a tendency to divert the main magnetic flux away from the seam area and thereby correspondingly decrease the electrical heating of such metal parts as necessarily lie immediately adjacent the seam.

The coil and core assembly is illustrated in the drawings as enclosed within a suitable shell or sleeve of insulating material 31 which is in turn surrounded by protecting armor 32 of suitable construction and hereinafter described in greater detail.

By reference more particularly to Figure 1 of the drawings, it will be apparent that the free or projecting end of the assembly 9 is provided with inside welding rolls 33 and 34 suitably secured to and carried by such assembly.

The protective or armoring means for the inner assembly is illustrated in Figure 2 as comprising a series of slats 35 each provided with water cooling ducts 36 secured thereto in heat conducting relationship. The slats are preferably of high resistance, non-magnetic metal spaced at their adjacent edges, as illustrated, to provide a discontinuous conducting path within the material M. I have found that such slats may be conveniently constructed of manganese steel, Monel metal, or the like, whereby eddy currents are reduced to a minimum. If desired, however, they may be formed of copper suitably subdivided preferably to a greater extent than indicated in Figure 2. In some cases copper is preferred due to its greater heat conductivity.

The use of the apparatus described is characterized by subjecting the material to an edge shaping or deforming operation of the general nature before referred to. In Figures 2 and 3 of the drawings this shaping operation is illustrated as having been such as to give to the edge portions substantially radially extending lips 37 terminating in reversely extending flanges 38. This construction affords re-entrant portions 39 into which the peripheral portions of the rollers 12 are adapted to extend. These rollers, which are of extremely rigid construction and mounting are effective directly on the edge portions for guiding the same in the desired peripheral spacing as well as radial position. The peripheral spacing is obtained directly by the engagement of the peripheral portions of the rollers 12 with the substantially radially extending lips 37 and functioning against the normal tendency of the material to spring outwardly, while the radial spacing is obtained by reason of the contact of the opposite edge portions of the rollers 12 with the outside of the material M and the underside of the flanges 38 respectively, thereby preventing the edge portions from moving either inwardly or outwardly. This represents an accuracy of positioning independent of the thinness of the material, which has not heretofore been obtainable in an induction welding apparatus.

This special shaping of the edge portions of the material also possesses other desirable advantages. In the first place, it obviates the necessity of preliminary accurate shearing of the material to predetermined width and absence of camber. This is true for the reason that the shaping operation to which the material is subjected will be performed only with respect to giving to the main body of the material the desired contour, any excess metal in the edge portions being represented by a change in the width of the flanges 38, which is unimportant. This shaping operation therefore enables the apparatus to be utilized for the welding of sheets, strips or plates characterized by non-uniform width or presence of camber, inasmuch as the edge shaping operation compensates for any such irregularities. This is a further advantage not heretofore obtained in welding apparatus, such apparatus having previously required almost absolute precision in the shearing of the stock utilized. In the second place, the shaping operation gives abutting edge portions of greater thickness in a generally radial direction than the thickness of the material itself. This permits the production of a weld of greater thickness than the thickness of the material and consequently of much greater strength. In the third place, it affords thickened edges of such nature that when subsequently brought into abutting engagement the tendency to over-ride or overlap is substantially completely eliminated, which has not heretofore been possible particularly with thinner gauges of material. In the fourth place it insures an operation in which all extruded metal is outside of the peripheral contour of the main portion of the material itself and so located that it may be subsequently removed by a suitable trimming or shearing operation. In the fifth place it insures an operation such that all pock marks or pockets in the material, along the seam, lie in the thickened lip zone, from which they may be readily removed as described.

In addition to the foregoing advantages, the re-entrant portions make it possible to provide protective slabs 40 shaped to conform to the rollers 12 so as to lie adjacent thereto, and of such length and width as to absolutely protect the entire outer surface of the tube from all ejected particles and other extraneous matter, and leave the entire outer surface of the material clean and smooth. This is particularly important from a commercial standpoint since welded tubing has heretofore been characterized by the rolling into the peripheral portions thereof of more or less foreign matter which constitutes no part of the weld proper and greatly reduces the strength of the finished article, inasmuch as it effects a reduction in the section thereof. The improved method also results in the production of articles having a superior finish and appearance.

I have also found that the slabs 40 if made out of suitable hard material, such as manganese steel, may be used in place of the rollers 12 for performing, in addition to their normal functions, all of the functions of the rollers 12. In any case they may be so shaped as to provide continuous holding and guiding means for the material throughout the heating zone.

The heating zone, as will be apparent to those skilled in the art is, with an apparatus of the character illustrated, normally but not necessarily subdivided into two definite zones of different characteristics. These zones, where provided, comprise a flash zone in which the edges are maintained in definite peripheral spaced relationship in the manner described and in which heating is accomplished by the production of a flash maintained in point of space as the material travels through the apparatus. The flash zone is followed by a resistance heating zone characterized by the bringing of the edge portions into actual contact prior to the actual application of the welding pressure.

I have further found that induction welding operations as heretofore practiced have been characterized by certain additional difficulties. Where peripheral rollers have been utilized for sizing the material and holding it as nearly as possible in the desired shape, such rollers by reason of providing peripherally spaced points of contact, tend to change the spacing of the edges of the material in direct proportion to any changes from a truly circular or approximately circular contour. Since the maintenance of an effective flash zone is dependent upon extreme accuracy of spacing of the edge portions, such a disturbance in the spacing has constituted a serious defect in the commercial operation of induction welding apparatus. By means of my invention moderate deviations in the contour of the material have no appreciable effect on the spacing of the edge portions since they are definitely controlled and guided by the means hereinbefore described. I have also found that such means make it possible to eliminate some or all of the crushing and sizing rolls 5 as well as some or all of the welding rolls 4, these rolls being replaced by rollers generally similar to the rollers 12 but preferably of slightly heavier construction and operating on the edge areas only of the material. Such an operation on the edge areas only makes it possible to utilize the invention for the production of articles of changing cross sectional area and configuration as before described.

I have also found that in some cases material as preformed into a substantially tubular shape, for example, has such a width imparted thereto that the edge portions instead of tending to separate, may, in some cases, tend to move together. In Figure 5 there is illustrated a slightly modified embodiment of the invention by means of which it is possible to effect a uniform weld whether the edge portions of the material M' tend to exert an opening pressure or a closing pressure or the two in succession. This may be accomplished by the provision of rollers 12' functioning similar to the rollers 12 heretofore described, and by the provision of supplemental rollers 41 effective on supplemental edge portions 42 so shaped and positioned as to permit the rollers 41 to exert a force in opposition to the force of the rollers 12'. In this manner the seam will be accurately positioned and controlled irrespective of any normal closing or opening pressure tendencies in the material itself.

An edge shaping operation of the character described does not, as would at first appear, involve a waste of metal beyond that which ordinarily characterizes present day operations. This is true for the reason that the portion of the material projecting beyond the dotted line AB, for example, of Figure 5, is simply representative of material which will ordinarily be removed from the edge portions of the plate previous to the forming up operation in order to insure the desired accuracy as to width and camber elimination. Since my invention obviates the need for any such accuracy, the preshearing may be dispensed with and the extra metal merely removed as a subsequent shearing or cutting operation. Such subsequent operations are usually deemed desirable, in any case, in order to remove or impart a definite shape to the burr usually formed under the welding pressure.

In Figure 6 there is illustrated a slightly different embodiment of my invention in which the lips 43 are not provided with re-entrant flanges, but are shaped for cooperation only with rollers 44 effective on the lips and on the outer periphery of the material adjacent thereto to give seam spacing and control. With the inner coil structure, the outward repulsion will maintain the material in contact with the rollers 44 and prevent inward movement of the edge portions.

In Figure 7 there is illustrated a slightly modified embodiment of the invention in which parts corresponding to similar parts in Figure 6 are designated by the same reference characters having a prime (') affixed thereto. In this figure the preshaping is illustrated as having been such that the lips 43' are partly outside of the normal peripheral contour of the material and partly within the same.

In Figure 8 the material is illustrated as having been subjected to a deforming operation giving thickened edge portions 45 under-cut to cooperate with rollers 46. By reason of this particular shaping of the thickened edge portions it is possible to hold and control the seam similarly to the operations described in connection with Figures 1 to 4.

To those skilled in the art it will be apparent that I have herein simply illustrated certain representative edge shaping or deforming operations, many other shapes readily suggesting themselves. Also, since shaping means suitable for the shaping or deforming of the edges are well known in the art, both for material of substantially constant width as well as for material of changing width, I have herein not shown any apparatus for effecting such shaping or deforming operations. In this respect, however, reference may be had to the patent to Frahm and Riemenschneider, 1,765,368 of June 24, 1930. While such patent is particularly directed to shaping by upsetting, it is illustrative of the different mechanisms generally suitable for the purposes contemplated. While the invention of such patent contemplates the subsequent use of the material with the edge portions in actual abutting engagement, my invention, among other things, distinguishes therefrom with respect to the edge operations performed on the material and the uses to which the shaped portions are put. Thus in the Frahm et al. patent no special use is made of the specially shaped edge portions while, in accordance with my invention, such portions preferably serve an important purpose in the proper control and guiding of the material. It will also be appreciated that while the invention of the patent is particularly set forth as not being adaptable to resistance welding, my invention is adaptable to resistance welding, as well as to flash heating operations wherein the edge portions are maintained out of contact during heating, but necessarily accurately controlled as to the position thereof during such heating operation.

It will further be understood that use of the articles produced in accordance with the present invention may be subjected to a subsequent shearing or trimming operation such as referred to in connection with Figure 5, for example, for removing any desired amount of the previously shaped edge portions. This subsequent shearing or trimming operation may be carried to any extent desired either for leaving a projection on the article along the seam, or for trimming the same substantially flush with the adjacent portions of the metal. This shearing or trimming operation may be performed in any manner, as well understood in the art, the details of the shearing mechanism constituting no part of the present invention, and therefore not being illustrated herein.

The present invention is characterized by the production of an article in which the edge portions are in precision engagement by reason of the preshaping thereof. The finished article is further characterized by a smooth exterior absolutely free from rolled in particles or bodies, or any extruded material whatsoever, thus constituting a marked advance in the art. The articles are further characterized by reason of what may be termed a 100 per cent weld, i. e., a weld, the strength of which is not less than the strength of the remaining parent metal sections. By a proper preshaping operation it is also possible to provide a substantially tubular article having the inside wall thereof entirely free from any burr or projection. This enables the welded material to be utilized for the transmission of any desired fluids, and more particularly fluids of a non-homogeneous character in which any straight rifling or the like within the tube prevents whirling of the fluids and thereby prevents maintenance of the original mixture.

While I have herein referred to many of the advantages which characterize the present invention, many other advantages will appear by reason of the description and drawings constituting part of my invention. It will also be understood that changes in the construction of the apparatus and in the method of practicing the invention may be made without departing either from the spirit thereof or the scope of my broader claims.

I claim:

1. In a method of welding a seam between two metal edges, the steps including bending the edges back on themselves to form guide-receiving spaces, moving said edges in spaced relation along guides extending into the spaces, causing the bent back edges to approach each other, and causing welding current to flow therebetween.

2. In a method of welding a seam between two metal edges, the steps including bending the edges back on themselves to form guide-receiving spaces, moving said edges in spaced relation along guides extending into the spaces, causing the bent back edges to approach each other, causing welding current to flow therebetween, and shielding the metal adjacent said bent back edges from material ejected between the latter.

3. In a method of making tubes, the steps including bending a flat plate to tubular form, bending the edges of the plate back on themselves, moving the blank thus formed while engaging said bent back edges with guides, causing said edges to approach each other, and causing a welding current to flow therebetween.

4. Apparatus for welding a seam between two metal edges bent back upon themselves, comprising a plurality of rolls peripherally engaging the bent back edges and effective to maintain them in spaced relation, and means for causing a heating current to flow between said edges.

5. Apparatus for welding a seam between two metal edges bent back upon themselves, comprising a plurality of rolls peripherally engaging the bent back edges and effective to maintain them in spaced relation, means for causing a heating current to flow between said edges, and shields adjacent said edges to protect the metal from the deposition of material ejected therebetween.

6. An apparatus for making tubes comprising blank feeding means, guides for engaging the interior of bent back edges of the blank for maintaining them in spaced relation, means for causing the heating current to flow between said edges, and means for pressing said edges together.

7. In a method of making tubes, the steps including bending back the edges of a formed tubular blank, to provide guide channels, moving the blank axially, engaging said channels to guide the blank edges and maintain a predetermined spaced relation therebetween, and causing a heating current to flow between said edges.

8. Apparatus for welding tubular blanks having their edges bent back on themselves, comprising means exteriorly of the blank for engaging said edge portions to oppose any inward closing tendency of the blank, and other means engaging said edge portions for opposing any tendency of the blank to open outward.

9. Apparatus for progressively welding a formed tubular blank having bent back edges, comprising means engaging said edges for spacing them apart and positioning them radially relative to the blank, means for feeding the blank forward, means for supplying heating current thereto, and means for pressing the heated edges together.

JAMES L. ADAMS, Jr.